US009294443B2

(12) United States Patent
Johnson et al.

(10) Patent No.: US 9,294,443 B2
(45) Date of Patent: Mar. 22, 2016

(54) SECURE INTEGRATION OF HYBRID CLOUDS WITH ENTERPRISE NETWORKS

(71) Applicants: Robert A Johnson, Malvern, PA (US); Mark S Brandt, Irvine, CA (US); Christopher A Byrd, Irvine, CA (US); Kathy Y Jaing, Irvine, CA (US)

(72) Inventors: Robert A Johnson, Malvern, PA (US); Mark S Brandt, Irvine, CA (US); Christopher A Byrd, Irvine, CA (US); Kathy Y Jaing, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/474,459

(22) Filed: Sep. 2, 2014

(65) Prior Publication Data
US 2015/0381568 A1 Dec. 31, 2015

Related U.S. Application Data

(60) Provisional application No. 62/018,791, filed on Jun. 30, 2014.

(51) Int. Cl.
H04L 29/06 (2006.01)
G06F 21/10 (2013.01)

(52) U.S. Cl.
CPC .......... H04L 63/0272 (2013.01); G06F 21/105 (2013.01); H04L 63/0209 (2013.01); H04L 63/029 (2013.01); H04L 63/0485 (2013.01)

(58) Field of Classification Search
CPC ............ H04L 63/0272; H04L 63/0209; H04L 63/029; H04L 63/0485; G06F 21/105
USPC .......................................................... 726/15
See application file for complete search history.

(56) References Cited

U.S. PATENT DOCUMENTS

| 6,845,374 B1* | 1/2005 | Oliver | G06F 17/30675 |
| 2008/0072035 A1* | 3/2008 | Johnson | H04L 63/0428 713/153 |
| 2010/0125730 A1* | 5/2010 | Dodgson | G06F 21/62 713/153 |
| 2010/0150341 A1* | 6/2010 | Dodgson | G06F 21/805 380/29 |
| 2010/0306530 A1* | 12/2010 | Johnson | G06F 21/335 713/155 |
| 2012/0084838 A1* | 4/2012 | Inforzato | G06F 21/575 726/4 |
| 2014/0173017 A1* | 6/2014 | Takagi | H04L 67/06 709/213 |
| 2014/0365460 A1* | 12/2014 | Portnoy | G06F 17/3089 707/710 |
| 2014/0373092 A1* | 12/2014 | Hussain | H04L 63/08 726/3 |

* cited by examiner

Primary Examiner — Michael S McNally
(74) Attorney, Agent, or Firm — Richard J. Gregson

(57) ABSTRACT

A system and method of managing secure integration of a cloud-based computing resource with a private domain are disclosed. One system includes a hybrid cloud arrangement including a plurality of virtual machines, the plurality of virtual machines including at least a first virtual machine within the private domain and a second virtual machine within a public cloud. The system also includes a virtual data relay within the private domain and associated with the second virtual machine. The virtual data relay includes a private domain interface used to establish a secure communication link according to a first security protocol with each virtual machine within the private domain that is a member of a community of interest, the virtual data relay assigned a community of interest key used by the private domain interface and defining the community of interest of which the second virtual machine is a member. The virtual data relay also includes a public cloud interface used to establish a secure communication link with the second virtual machine, the public cloud interface using a second security protocol different from the first security protocol.

20 Claims, 11 Drawing Sheets

SECURE INTEGRATION OF HYBRID CLOUDS WITH ENTERPRISE NETWORKS

CROSS-REFERENCE TO RELATED APPLICATIONS

The present application claims priority from U.S. Provisional Patent Application No. 62/018,791, filed on Jun. 30, 2014, the disclosure of which is hereby incorporated by reference in its entirety.

The present application is also related to, and claims priority from the following related and commonly assigned U.S. Patent Applications:

1. U.S. Provisional Patent Application entitled: Distributed Security on Multiple Independent Networks using Secure "Parsing" Technology, by Robert Johnson, Ser. No. 60/648,531, filed 31 Jan. 2005;

2. U.S. Patent Application entitled: Integrated Multi-Level Security System, by Robert Johnson, Ser. No. 11/339,974 filed 26 Jan. 2006 claiming the benefit of the above provisional applications:

3. U.S. Patent Application entitled: Integrated Multi-Level Security System, by Robert Johnson et al., Ser. No. 11/714,590 filed 6 Mar. 2007 which is a continuation-in-part of U.S. application Ser. No. 11/339,974;

4. U.S. Patent Application entitled: Integrated Multi-Level Security System, by Robert Johnson et al., Ser. No. 11/714,666 filed 6 Mar. 2007 which is a continuation-in-part of U.S. application Ser. No. 11/339,974; and 5. U.S. Patent Application entitled: Integrated Multi-Level Security System, by Robert Johnson et al., Ser. No. 11/714,598 filed 6 Mar. 2007 which is a continuation-in-part of U.S. application Ser. No. 11/339,974.

6. U.S. patent application Ser. No. 12/272,012, entitled "Block Level Data Storage Security System", filed 17 Nov. 2008. The present disclosure also claims the benefit of commonly assigned U.S. patent application Ser. No. 12/336,558, entitled "Data Recovery Using Error Strip Identifiers", filed 17 Dec. 2008.

7 U.S. patent application Ser. No. 12/336,559 entitled "Storage Security Using Cryptographic Splitting", filed 17 Dec. 2008; U.S. patent application Ser. No. 12/336,562, entitled "Storage Security Using Cryptographic Splitting", filed 17 Dec. 2008; U.S. patent application Ser. No. 12/336,564, entitled "Storage Security Using Cryptographic Splitting", filed 17 Dec. 2008; and U.S. patent application Ser. No. 12/336,568, entitled "Storage Security Using Cryptographic Splitting", filed 17 Dec. 2008.

8. U.S. patent application Ser. No. 12/342,636 entitled "Storage Communities Of Interest Using Cryptographic Splitting", filed 23 Dec. 2008, U.S. patent application Ser. No. 12/342,575, entitled "Storage Communities Of Interest Using Cryptographic Splitting", filed 23 Dec. 2008, U.S. patent application Ser. No. 12/342,610, entitled "Storage Communities Of Interest Using Cryptographic Splitting", filed 23 Dec. 2008.

9. U.S. patent application Ser. No. 12/342,379, entitled "Secure Network Attached Storage Device Using Cryptographic Splitting", filed 23 Dec. 2008.

10. U.S. patent application Ser. No. 13/493,023, entitled "Software Handling Of Hardware Error Handling In Hypervisor-Based Systems", filed 5 Sep. 2012.

10. U.S. patent application Ser. No. 13/547,148, entitled "Automated Provisioning of Virtual Machines", filed 12 Jul. 2012.

The disclosures of each of these applications are hereby incorporated by reference in its entirety as if set forth in this application.

TECHNICAL FIELD

The present disclosure relates generally to security arrangements for cloud computing. In particular, the present disclosure relates to secure integration of hybrid clouds with enterprise networks.

BACKGROUND

Increasingly, it has become more common for organizations to use computing systems managed by the organization, as well as to utilize public cloud resources, to implement that organization's computing infrastructure. For example, many organizations opt to use public cloud computing infrastructures, such as Amazon's public cloud offering or Azure from Microsoft Corporation, alongside a private cloud arrangement, such as is available from VMware or based on Unisys's fabric computing (Forward!) solutions. This allows the organization to blend the security of a private domain network with the flexibility of a cloud-based, computing on demand arrangement in which computing systems can be commissioned and used on an as-needed basis.

Existing networked systems utilize a variety of security architectures that allow for distribution and association of computing systems in different ways to allow for different levels of data access and controlled computing system intercommunication. However, such networked system security architectures are not readily employed in a hybrid cloud environment in which portions of a networked computing arrangement may be located in a cloud environment and other portions or computing systems may be located within a private domain portion of the environment. This is because, if encryption keys or other security constructs are used, it may be deemed unsafe or not secure to provide those keys or security constructs to the cloud-based systems that form portions of the network. Accordingly, organizations that utilize such hybrid cloud systems often store most critical data within a private domain portion of that organization's network, and store less secure information in a cloud-based portion of the network. Even in such situations, organizations may opt to limit the interactivity between such cloud-based and private domain systems, to limit the probability of compromise of the organization's critical data.

Although such arrangements are possible, they are sub-optimal with respect to flexibility and administration. First, because this effectively creates classes of trusted and untrusted computing systems, two different authentication or communication standards may be used, complicating administration. Further, because this effectively requires all sensitive data to be maintained within the private domain, it limits the extent to which such cloud-based computing systems can be used, because of the limit to which sensitive data can be stored in cloud-based systems.

For these and other reasons, improvements are desirable.

SUMMARY

In summary, the present disclosure relates to security arrangements for cloud computing. In particular, the present disclosure relates to secure integration of hybrid clouds with enterprise networks, as well as remote credential management in such environments.

In a first aspect, a system for managing secure integration of a cloud-based computing resource with a private domain are disclosed. One system includes a hybrid cloud arrangement including a plurality of virtual machines, the plurality of virtual machines including at least a first virtual machine within the private domain and a second virtual machine within a public cloud. The system also includes a virtual data relay within the private domain and associated with the second virtual machine. The virtual data relay includes a private domain interface used to establish a secure communication link according to a first security protocol with each virtual machine within the private domain that is a member of a community of interest, the virtual data relay assigned a community of interest key used by the private domain interface and defining the community of interest of which the second virtual machine is a member. The virtual data relay also includes a public cloud interface used to establish a secure communication link with the second virtual machine, the public cloud interface using a second security protocol different from the first security protocol.

In a second aspect, a method of securely integrating a cloud-based computing resource with a private domain is disclosed. The method includes establishing a virtual data relay in a private domain of a hybrid cloud arrangement including a plurality of virtual machines across a private domain and a cloud-based domain, the virtual data relay dedicated to a cloud-based virtual machine. The method also includes receiving data addressed to the cloud-based virtual machine at a private domain interface of the virtual data relay according to a first security protocol from a virtual machine within the community of interest, the virtual machine included within the private domain. The method further includes transmitting the data to the cloud-based virtual machine according to a second security protocol different from the first security protocol.

In a third aspect, a system for managing secure integration of a cloud-based computing resource with a private domain is disclosed. The system includes a hybrid cloud arrangement including a plurality of virtual machines, the plurality of virtual machines including at least a first virtual machine within the private domain and a second virtual machine within a public cloud. The system also includes a virtual data relay within the private domain and associated with the second virtual machine. The virtual data relay includes a private domain interface used to establish a secure communication link according to a Stealth protocol with each virtual machine within the private domain that is a member of a community of interest, the virtual data relay assigned a community of interest key used by the private domain interface to secure communications within a community of interest of which the second virtual machine is a member. The virtual data relay also includes a public cloud interface. The system includes a gateway appliance through which communications from the virtual data relay are routed to the second virtual machine, the gateway appliance used to establish a VPN connection between the public cloud interface of the virtual data relay and the second virtual machine. The system further includes a licensing appliance accessible to each of the plurality of virtual machines via a licensing community of interest secured using a licensing community of interest key distributed to each of the plurality of virtual machines.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
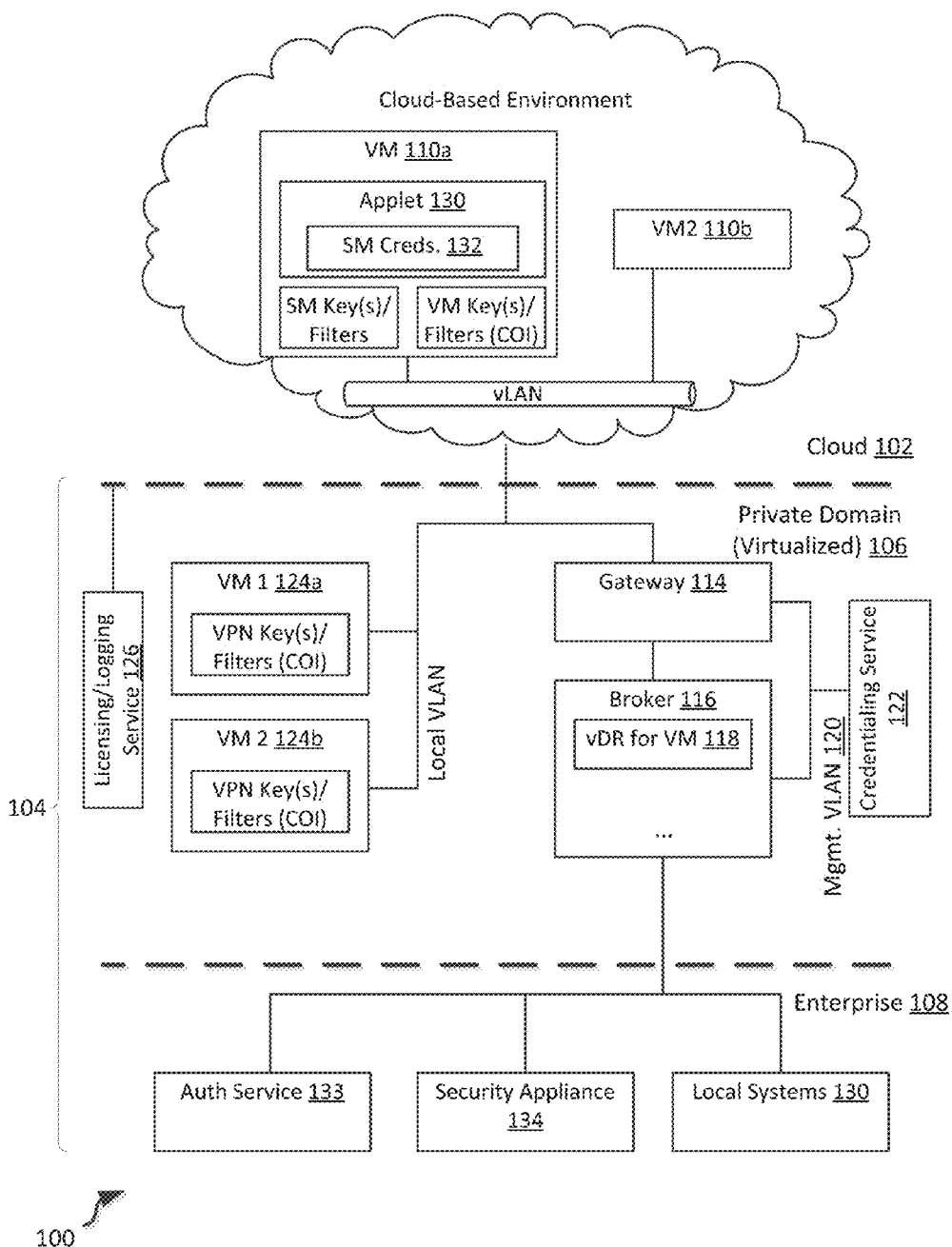
FIG. 1 illustrates an example architecture in which aspects of the present disclosure can be implemented.

As briefly described above, embodiments of the present invention are directed to methods and systems for securely integrating hybrid clouds with enterprise networks, as well as methods and systems used for authentication and management of cloud-based systems that allow for security of such systems to be ensured. Such arrangements as discussed herein provide uniform security across public and private domain portions of an organization's network, simplifying administration of an overall hybrid cloud network and improving flexibility regarding data storage and computing allocation.

According to example embodiments discussed herein, virtual machines in a network may be isolated by encrypting transmissions between the virtual machines with keys possessed only by an intended recipient. Within a network, the virtual machines may be logically organized into a number of community-of-interest (COI) groups. Each COI may use an encryption key to secure communications within the COI, such that only other virtual machines in the COI may decrypt the message. Virtual machines may be automatically provisioned with configuration information, such as the encryption keys, when the virtual machine is started. The provisioning information may be created based on a template stored on a configuration server.

In particular embodiments, the present disclosure relates to a combination of a secure public cloud arrangement with a Stealth technology provided by Unisys Corporation of Blue Bell, Pa., with additional features relating to integration and authentication that allow for ensured security across private and cloud-based domains. The common model provided by this arrangement, referred to herein as "SPealth", allows for secure commissioning, managing, and communicating with virtual machines (VMs) in multiple public cloud, private cloud, or fabric computing environments. This can include, for example, public cloud environments such as Amazon or Azure public cloud offerings, private cloud offerings from VMware, and fabric computing systems such as the Unisys Forward! computing environment.

It is noted that the features discussed herein represent an "inverted" model in which the security features provided by way of the Stealth system run internally to the secure public cloud, rather than allowing a public cloud to be integrated within the security constructs provided by the organization. This allows the integration of security and cloud-based computing systems to be cloud architecture agnostic, and to integrate with many cloud environments not just in the same manner, but concurrently.

In some embodiments, the secure hybrid cloud arrangements of the present disclosure can integrate different types of public cloud infrastructures into a common secure hybrid cloud as an extension of a private domain virtualization system. In connection with such integration, use of secure technologies in a private domain, including Stealth technology provided by Unisys Corporation of Blue Bell, Pa., can be integrated in a way that does not compromise security, for example by avoiding credential or key storage in a cloud environment. Additionally, because cloud-based management and security management systems are maintained separately, each can be independently upgraded or modified without affecting the other system.

In some cases discussed herein, gateway features can be used to provide a secure connection between a cloud-based virtual machine or set of virtual machines in a common virtual local area network (vLAN). In some such embodiments, a secure connection between a gateway and a cloud-based virtual machine or cloud vLAN can be established using a different security protocol, such as IPsec, from an internal security protocol, while a dedicated component within a private domain can act on behalf of the cloud-based virtual machine, thereby avoiding a requirement of sharing keys from a private domain to the public (cloud) domain.

Referring to FIG. 1, an example architecture 100 in which aspects of the present disclosure can be implemented is illustrated. The architecture 100 represents a schematic arrangement useable to establish a secure hybrid cloud that includes virtual machines established in both a private domain (e.g., managed within an organization) and in a cloud-based domain (e.g., on computing systems that are managed from a public domain or third-party network).

In the embodiment shown, the architecture 100 includes a cloud domain 102 and a private domain 104. The private domain 104 can include both a virtualized component 106, and an enterprise support component 108. Generally, the architecture represents computing resources available to an enterprise for managing, for example, computing or storage tasks.

In the embodiment shown, the cloud domain 102 includes a plurality of configurable cloud-based virtual machines 110 (shown as virtual machines, or VMs, 110a-b). The cloud-based virtual machines 110 can be configured for use in connection with a common virtual network, or vLAN 112, that allows the cloud-based VMs 110 to intercommunicate. The vLAN 112 is communicatively connected to the private domain, for example via a gateway device 114, as discussed below, for communication with locally-managed virtual machines within the private domain 104. Although in the present disclosure two cloud-based VMs 110a-b are shown, it is noted that other virtual machines, and associated in two or more vLAN arrangements, could be used as well. Examples of such arrangements are provided below in conjunction with FIGS. 3-4.

In private domain 104, a gateway device 114 provides a communication location for cloud-based VMs 110 to coordinate communication with private domain systems. In example embodiments, the gateway device 114 and the cloud broker 116 (including associated vDRs 118) form a Stealth-for-Cloud Gateway arrangement, in which the gateway device 114 is a virtualized software-only VM, for example based on the open source StrongSwan project. Other types of gateway devices are useable as well.

A cloud broker 116 can also be used to establish secure communications with such cloud-based VMs, for example by instantiating and managing virtual data relay devices, or vDRs 118, that manage private-domain community of interest keys and filters for cloud-based VMs while maintaining a dedicated connection to those cloud-based VMs. As noted below, use of such vDRs 118 can include, for example, a Stealth-based interface that uses private-domain community of interest keys and filters, also referred to herein as VPN COI keys and filters, for communication with private domain VMs, while providing an IPsec interface via the gateway 114 to a cloud-based VM 110 for secure communication over the internet.

When initially installed, the gateway device 114 and cloud broker 116 can be configured to provide IPsec-based secure communications to a cloud-based VM 110, as well as Stealth-based secure communications with other private domain systems. For example, for the IPsec-based security protocol configuration, a VPN client arrangement should be instantiated (e.g., a StrongSwan instance), and an Internet-routable IP address assigned, as well as capacities of the VPN connection. The cloud broker 116 should be configured with appropriate Stealth-based credentials, as well as the service community of interest and filters to be used, as well as capacities of that cloud broker's connection. Other configuration features can be initialized and set prior to addition of cloud-based VMs 110 as noted herein.

In addition, in the embodiment shown, a credentialing service 122 can be provided that connects to the gateway device 114 and the broker 116 via a management vLAN 120. The credentialing service 122 can be implemented as a separate virtual machine or service, and generates and provides credentials for use across the secure hybrid cloud, such that credentials need not be stored at each VM when that VM is created; rather, credentials for VMs can be retrieved on demand, for example based on requests received at the gateway device 114.

Using the credentialing service 122, credentials specific to their purpose are provided at boot time, used immediately to authenticate a VM and authorize its COIs, and then the credentials are discarded. Use and discarding of credentials after authentication prevents replay attacks, duplicating VMs outside the context of Stealth-for-Cloud (S4C), and RAM/VM scraping for credentials.

In addition, within the private domain 104, a plurality of private domain virtual machines 124 can be maintained. These VMs 124 can be within the same or different COIs to each other and to the cloud-based VMs 110. The VMs can, when instantiated, similarly request VPN keys and filters useable to provide communicative access to those VMs 124 by other systems within a common community of interest. A licensing and logging service 126 can be implemented within the private domain 104 as well, to provide management functions associated with the various VMs 110, 124 created within the overall arrangement.

In some embodiments, the enterprise support component 108 can include systems used to provide security to computing systems, including both virtual systems and physical systems, within the enterprise. In particular, the enterprise support component 108 can include a plurality of local systems 130 (e.g., hardware or virtual systems) as well as Stealth-enabling systems including an authorization service 133 and a security appliance 134. The authorization service 133 maintains and distributes community of interest keys in response to receipt of credentials in a request (as have previously been retrieved by a hardware or virtualized system from the credentialing service 122. The authorization service 133 can also maintain and distribute filters for use in connection with such community of interest keys for controlling communicative access among systems in the overall arrangement 100. In example embodiments, the authorization service 133 corresponds to a Stealth authorization service that can be used to authorize each Stealth-based (secured) endpoint within an enterprise, as well as via cloud-based VMs 110 and vDRs 118 used to communicate with such cloud-based VMs.

Using the authorization service 133, cloud-based VMs 110 are authenticated and authorized twice. The first authorization is to authenticate the IPsec VPN connection and authorize the corresponding vDR's COIs, providing the vDR 118 that is associated with each particular VM 110 with COI keys and filters. The second authentication is to authenticate a logon service of the VM 110, and authorizes cloud-based COIs for use within the cloud. For example, the logon service can be authenticated using an Active Directory instance or via an authentication performed from the enterprise domain 108.

In the embodiment shown, the security appliance 134 can be used as a secure endpoint to which other non-secured computing systems or enterprise resources can be connected (e.g., SAN systems, or other storage). In example embodiments, the security appliance 134 could alternatively be used as the licensing and logging service 126.

Referring back to the cloud-based VMs 110, in the embodiment shown, a cloud-based VM can include a preinstalled applet 130 that stores service mode credentials 132 useable to initiate authentication of the cloud-based VM 110. Additionally, and as discussed further below in connection with FIGS. 3-5, the service mode credentials 132 can be used to obtain service mode keys and/or filters useable to access the authorization service 133, and thereby obtain virtual machine keys and filters that associate the VM with a particular community of interest.

In example embodiments, credentialing of the cloud-based VMs 110 can be accomplished via the applet 130. In particular, credentials for any IPsec VPN/vDR COIs and intra-cloud COIs (as discussed below in connection with FIGS. 5A-5D) are passed to the cloud-based VM 110 when it is started, but for security purposes those credentials are not retained within the VM. Additionally, Stealth software included in each VM 110, 124 can be initially installed in an on-demand mode, using a service mode configuration. In such a configuration, only IPsec VPN traffic may be allowed to/from the gateway 114. This allows control over the systems with which each VM can communicate prior to full authentication. The applet 130 controls establishing the IPsec VPN connection to the gateway 114 from each cloud-based VM 110, and enables Stealth-based communication based on credentials supplied via the credentialing service 122. Accordingly, when a cloud-based VM 110 is instantiated, it should include not only the applet 130, but also services capable of managing a Stealth-based security protocol (for intra-cloud communication within a particular vLAN) and an IPsec-based security protocol for communication with the gateway 114 and cloud broker 116 (and associated vDR 118).

Referring to FIG. 1 overall, it is noted that although the present disclosure relates to methods of integrating cloud-based virtual machines into a private virtualization environment, it is noted that in initializing the overall arrangement 100 of FIG. 1, particular security features should be initialized prior to adding cloud-based VMs, such as VMs 110, to such an arrangement. For example, communities of interest, filter sets, and roles are typically created in the authorization service 133 or otherwise outside of the cloud-based environment which meet the requirements of a VM to be added. Furthermore, one or more security groups corresponding to the roles intended to be assigned to a particular VM should be created, for example in Active Directory. User members of a security group should also be defined.

Furthermore, and still referring to FIG. 1, particular features of the arrangement 100 itself should be installed prior to addition of cloud-based VMs. For example, the security appliance 134, as well as the licensing and logging service 126 should be initialized and configured to be assigned an internet-routable IP address (or addresses, if multiple such systems are deployed) and particular communities of interest, such as an administrator CO, a service COI, and a license COI should be defined alongside associated filters. For example, an administrative service filter may allow access to any VM within the arrangement, while a license filter that is distributed to a remote system should limit access by that system using the licensing COI to communications with the licensing and logging server, despite the fact that each of the other VMs will also be members of that COI for the licensing/logging requirements associated with those other VMs. Additionally, a security installation package (e.g., to administer Stealth within each VM to be instantiated) is prepared for inclusion in each VM, and for each OS hosted within a VM.

Figure 2A:
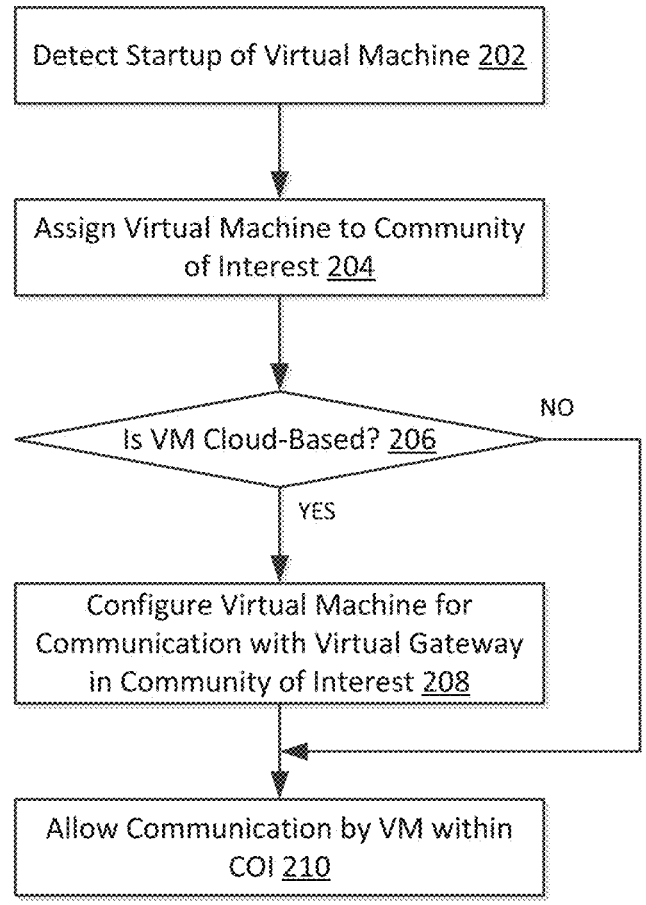
FIG. 2A illustrates an example sequence of operations for commissioning and authenticating a virtual machine for use within the secure hybrid cloud, according to example embodiments.
Figure 2B:
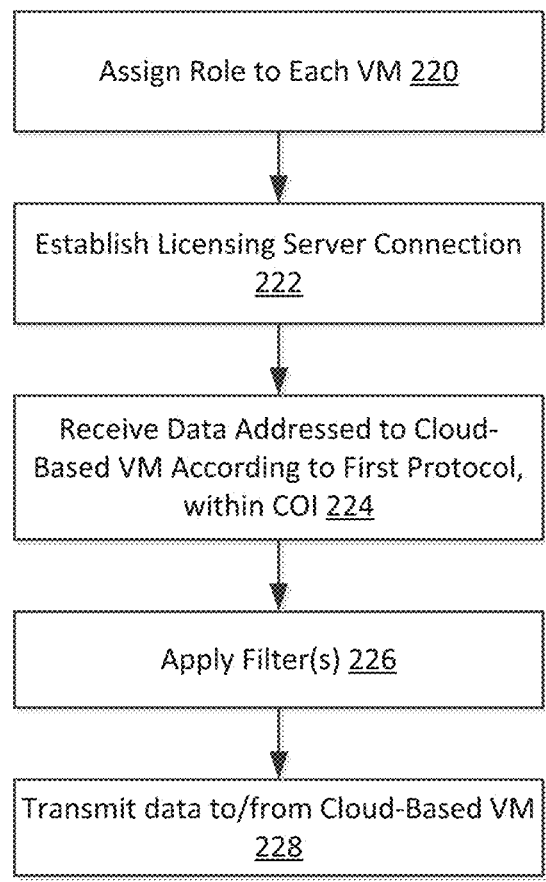
FIG. 2B illustrates an example sequence of operations for communicating with an authenticated virtual machine within a secure hybrid cloud, according to example embodiments.

Referring to FIGS. 2A-2B, additional details regarding initialization and operation of cloud-based virtual machines, such as VMs 110, are provided. In particular, FIG. 2A illustrates an example sequence of operations for commissioning and authenticating a virtual machine for use within the secure hybrid cloud, according to example embodiments. FIG. 2B illustrates an example sequence of operations for communicating with an authenticated virtual machine within a secure hybrid cloud, according to example embodiments.

Referring specifically to FIG. 2A, a method 200 of authenticating a virtual machine, such as cloud-based VM 110 or virtual machine 124 resident in the private domain of FIG. 1. The method 200 is described as starting upon detection of such a virtual machine being initialized, at startup detection operation 202. This can occur, for example, based on detection of that virtual machine transmitting a request for addition to a vLAN or otherwise indicating its presence to an overall computing arrangement, as discussed above in connection with FIG. 1.

When a cloud VM is commissioned (e.g., when a VMware template, or Amazon AMI is instantiated, or some other blueprint for a virtual machine is used), certain tenant-specific configuration information is provided to initialize the VM. The mechanisms for delivering this commissioning information to the VM may differ by platform. However, the format and contents of the commissioning information is across all cloud platforms within the supported OS levels, and as described above. In particular, Stealth software should be commissioned with a URL of the authorization service 133 used for authentication and authorization of the VM, and the IPsec VPN client configuration information, including the IP address of the gateway 114 and service mode credentials useable to access the credentialing service 122.

Continuing with method 200, each virtual machine that is instantiated can be added to one or more communities of interest in operation 204. As noted above, and as described in numerous copending applications cited above, communities of interest refer generally to like-situated systems that are intended to be allowed to share data and to view each other. By way of contrast, despite being in a common physical network or cloud arrangement, virtual machines that are not included in any overlapping communities of interest not only cannot intercommunicate, but are in fact invisible to one another.

In connection with the present disclosure, it is determined whether the virtual machine to be instantiated is a cloud-based virtual machine (e.g., cloud-based VM 110) or a private domain virtual machine (e.g., VM 124). If a cloud-based virtual machine, the virtual machine is configured for communication with a virtual gateway (e.g., gateway 114) that is defined to allow communication with the cloud-based VM as if it were a part of a community of interest that is maintained within the private domain. This can be accomplished in a variety of ways. In example embodiments, a cloud-based VM can obtain a VM COI key and associated filters by first requesting a service mode key and filters, thereby allowing the cloud-based VM (e.g., applet 130 of that VM) to access a credentialing service 122 to obtain VM credentials (credentials used directly by the cloud-based VM) and/or VPN credentials (credentials used by the vDR to communicate with private domain VMs on behalf of the cloud-based VM), allowing for (1) secured communication, via Stealth, within the cloud-based vLAN using a VM COT key(s) and associated filter(s), (2) secured communication, via IPsec, with the gateway 114, and (3) secured communications from the vDR to private-domain VMs via the VPN COI key(s) and associated filters. Additional details regarding assignment of different community of interest keys to ensure privacy of COI keys for a community of interest are described below in connection with FIGS. 5A-5D.

Upon configuring the VM for communication with a virtual gateway in the COI, or upon a determination that the VM is not a cloud-based VM, the method 200 includes allowing communication by the VM within assigned COIs, for example via operation 210. It is noted that if the VM is not a cloud-based VM, some level of authentication will also occur; however, that authentication, which involves use of service mode keys and direct delivery of COT keys and filters, does not require use of separate keys and filters on opposite sides of the cloud-private domain arrangement, and as such is comparatively straightforward.

FIG. 2B illustrates an example sequence of operations for communicating with an authenticated virtual machine within a secure hybrid cloud, or to an authenticated virtual machine, according to example embodiments. In example embodiments, FIG. 2B therefore discloses additional details of operation 210, according to example embodiments.

In the example shown, at operation 220, each VM is assigned a role; for example the role may be defined to be a member in a particular community of interest, to allow access by a predetermined set of users, or otherwise to have a task within a networked group of VMs. A licensing server connection is established at operation 222, which allows for a licensing connection (e.g., a monitoring connection) as well as a logging connection to be maintained to the VM, to ensure an appliance is monitoring the current operational status (e.g., operating, idle, failed, terminated, etc.) of each VM.

In the example shown, data addressed to a cloud-based VM, such as cloud-based VM 110 of FIG. 1, can be received at operation 224. If this data originates at a private domain virtual machine, this operation may occur, for example, at a vDR, and may correspond to receipt of data destined for a cloud-based VM from a private-domain VM or other computing system. Accordingly, that received data can be allowed to be retransmitted to one or more other devices, for example based on a filter list. Example use of filters is discussed below. Alternatively, if communications are to occur among cloud-based VMs, receipt of data to be transmitted can be performed at a Stealth component installed in the VM that is to transmit data.

A filter application operation 226 applies one or more filters to determine what communications are allowed among systems sharing COT keys. For example, in a cloud arrangement, a default filter nay be applied that defines permissions among cloud-based VMs. For example, a clear text filter may be provided to the cloud-based VM that appears as follows, assuming cloud addresses T1.x.y.x/w:

Clear-Text
Allow All
Except T1.x.y.z/w

Additionally, if COI-based segmentation of VMs within the cloud is required, filters could be applied that enforce communication boundaries between communities of interest in the cloud. An example may be as follows:

Clear-Text:
Allow All
  Except T1.x.y.z/w
COI-A (local cloud COI):
Allow T1.x.y.1
COI-B (local cloud COT):
Allow T1.x.y.z/w
  Except T1.x.y.1

Using these sets of filters, traffic, except traffic local to the cloud, bypasses the Stealth endpoint processing. If the traffic is destined for the private domain, the IP layer will route it through the secure IPsec connection to the gateway 114 without application of Stealth, and also allows clear text traffic to/from the Internet. By way of contrast, if no Internet access is used, a slightly different set of filters could be used:

Clear-Text
Allow T1.E.a.b./c
COI-A
Allow T1.x.y.z/w

Following application of filters, data is transmitted to a destination cloud-based VM according to permissions set by the filters, in operation 228. If originating from the private domain and destined for the cloud-based VM, this would involve transmission via an IPsec secure connection. If between cloud VMs, the intra-cloud Stealth COIs could define routing restrictions.

Figure 3:
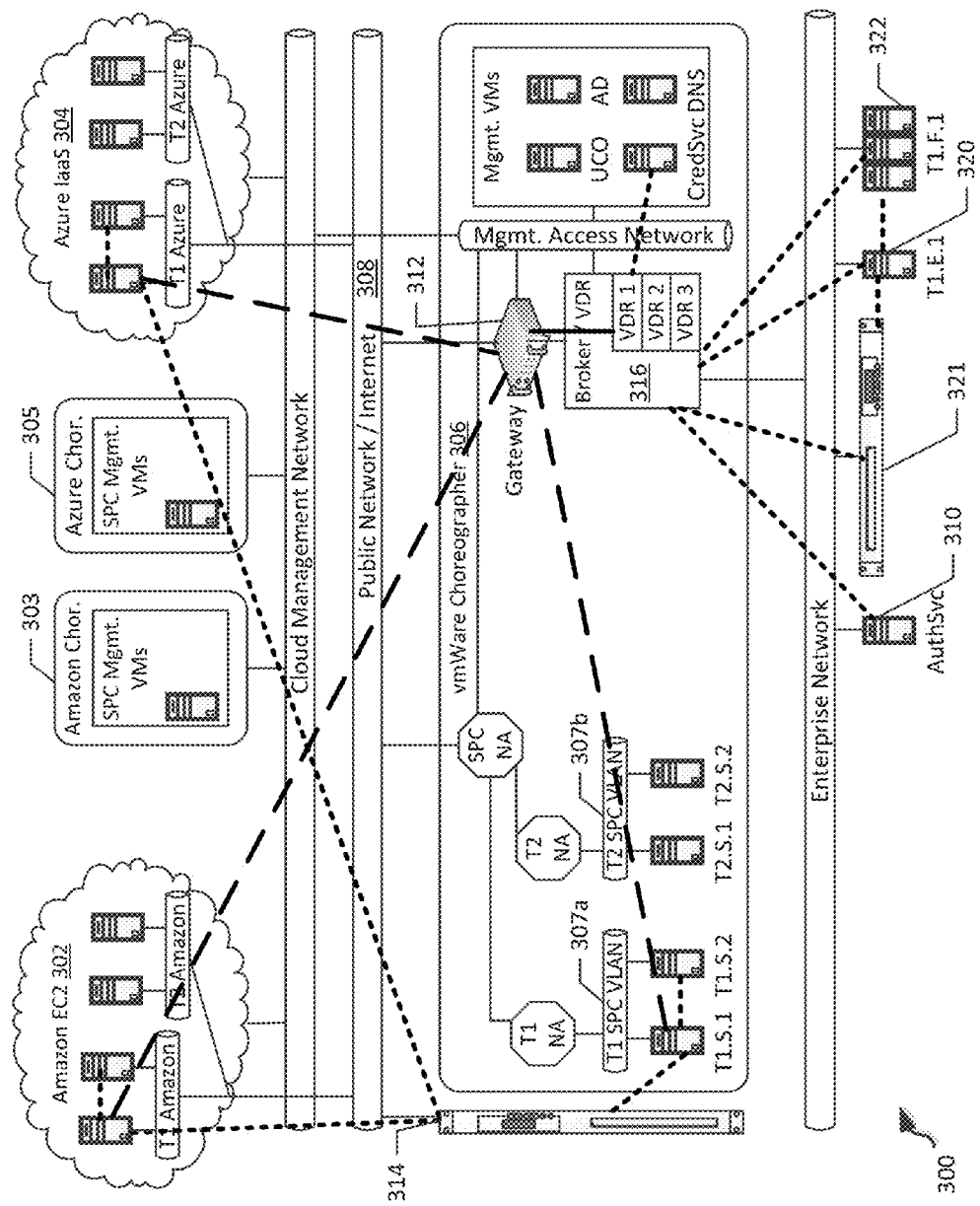
FIG. 3 illustrates a particular arrangement of a secure hybrid cloud in which aspects of the present disclosure can be implemented.
Figure 4:
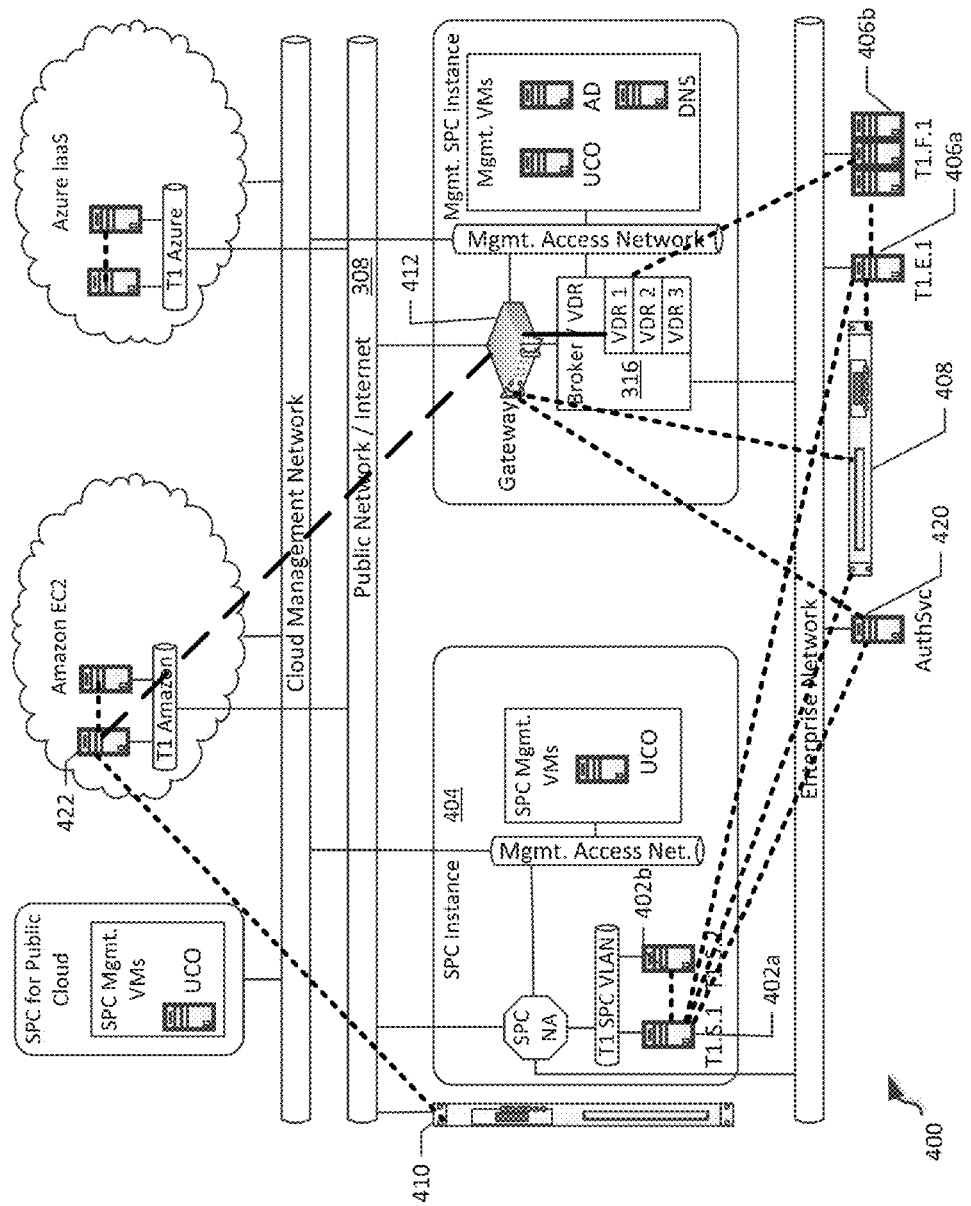
FIG. 4 illustrates a second particular arrangement of a secure hybrid cloud in which aspects of the present disclosure can be implemented.

Referring now to FIGS. 3-4, particular arrangements of a secure hybrid cloud are illustrated that can operate according to the general principles discussed above in connection with FIGS. 1-2. FIG. 3 illustrates a particular arrangement of a secure hybrid cloud 300 in which aspects of the present disclosure can be implemented. In particular, FIG. 3 illustrates Stealth-enabled endpoints in public clouds 302-304, shown as Amazon and Azure-based public clouds, respectively. Additionally, FIG. 3 shows integration of those clouds with a secure private cloud 306, communicatively connected to the public clouds via the Internet 308. Management tooling is employed by the enterprise and security administrators to define COIs, filter sets, and roles; to assign users to roles; to configure and manage Stealth appliances; and to provision the authorization services. In FIG. 3, the AuthSvc server 310 represents this set of Stealth tooling.

It is noted that, in the embodiment shown, a particular arrangement of services and servers is depicted that generally correspond to those as described above in connection with FIG. 1, but in a particular arrangement. For example, within the public clouds 302-304, there are shown two separate vLANs, thereby requiring separate COIs and filters for the different vLANs. The same is true within the secure private cloud 306, with separate T1 and T2 vLANs 307a-b as shown.

In the example shown in FIG. 3, different tunnels are illustrated by dotted lines to show the type of secure connections established among devices. For example, between each of the cloud-based VMs and a gateway 312, cloud-to-private domain traffic is managed via an IPsec connection, shown by long dashed lines. However, connections of cloud-based VMs to a licensing and logging server 314 are secured by a Stealth-based connection (shown as dotted line connections). Similarly, communications between a cloud broker 316 and any other local systems, such as local VMs 318a-b within the secure private cloud 306, or hardware-based systems (shown as local systems 320, 322) are similarly secured by Stealth to the broker 324 (e.g., via Stealth appliance 321). Further, communications within a management vLAN, for example between the broker 324 and a credentialing service 326 used to authenticate new VMs, can be secured by Stealth as well, but using an administrative or management COI different from the one used among VMs within the cloud systems or in the secure private cloud.

In the embodiment shown, separate Secure Private Cloud management instances are installed for each cloud-based solution employed. For example, in the embodiment shown, separate Amazon and Azure Secure Private Cloud instances 303, 305 are installed, respectively, and provide management of virtual machines that are instantiated within each of those respective environments.

Accordingly four instances of secure private cloud may be installed within an overall arrangement such as that shown—an instance to commission and manage Amazon VMs; an instance to commission and manage Azure VMs; an instance to commission and manage VMware VMs; and an instance containing the SPC management and the Stealth-for-Cloud (S4C) components. Furthermore because Stealth-secured endpoints can reside in public clouds, within a secure private cloud 306 (e.g., in a VMware based or Forward! partition provided by Unisys Corporation), or as a standalone server or workstation, each endpoint is provisioned, configured, and managed the same with the only difference being related to the underlying virtualization environment employed. Each endpoint will use Stealth-based tunnels for communication within a particular environment, as well as for licensing and logging features. For this license tunnel, if the endpoint's address is NATed, as is the case for VMs, the license tunnel may be established UDP-encapsulated. To speed up the initialization process, a flag may be placed in the registry of the OS included in a particular VM that is instantiated, for example to force UDP encapsulation of the license tunnel. However, and as noted above, access from the cloud environments into the enterprise's intranet is through an IPsec VPN connection from the cloud-based VM to the gateway 312 and vDR virtual appliances of the broker 324. The OS-native IPsec VPN client software can therefore be used.

FIG. 4 illustrates a second particular arrangement 400 of a secure hybrid cloud in which aspects of the present disclosure can be implemented. In this arrangement, virtual machines 402a-b within a secure private cloud 404 are directly connected to and integrated with an underlying secured enterprise environment, including Stealth-secured hardware systems 406a-b. In this arrangement, a security server, such as an enterprise Stealth appliance 408, can be used for licensing of virtual machines 402a-b, rather than using a licensing and logging device 410. Accordingly, traffic from the virtual machines 402a-b in the private domain does not transmit to a gateway 412 provided in this arrangement; rather, tenant separation relies on use of Stealth communities of interest being properly defined, rather than using a broker 414. By way of contrast, cloud-based VMs (e.g., VM 422 as shown) continue to license and log via the licensing and logging device 410, and communicate with gateway 412 via IPsec.

As compared to the arrangement in FIG. 3, commissioning information for VMware VMs in this architecture is different from that required by the public cloud VMs. In this arrangement, rather than having private domain virtual machines be licensed and logged by the same licensing and logging appliance used for cloud-based VMs, the private VMs could be configured and license/log in the same manner as the enterprise-resident Stealth endpoints using the local Stealth appliance 408, although an SPC management VM (e.g., in management VLAN local to that secure private cloud 404 (or from a management secure private cloud 416) could still set the login service credentials. Communications to cloud-based VMs remains unchanged relative to the arrangement of FIG. 3, with such communications being routed through broker 414 and gateway 412, and using an authorization server 420.

It is noted that, in some embodiments, a credentialing service used by the management secure private cloud can set one time passwords that can be passed to the authorization server 420 for use during authentication, and in particular for use in passing role credentials to an applet of a VM to be instantiated. In alternative embodiments, the credentialing service can use other types of authentication, for example reusable passwords or tokens that identify a particular device and/or user's credentials.

Furthermore, and as is apparent from both FIGS. 3-4, the arrangements of authentication services do not affect the ability to integrate cloud-based virtual machines into an enterprise's overall computing environment; as illustrated in both examples, different types of cloud environments can be integrated with a private domain virtualization or platform-based security architecture, consistent with the present disclosure.

Referring now to FIGS. 5A-5D, a detailed sequence of operations executable within a secure hybrid cloud arrangement such as those described above in connection with FIGS. 1-4 is depicted. The sequence of operations described herein represents a particular implementation of instantiation and authentication of cloud-based virtual machines, as described in FIGS. 2A-2B. In FIGS. 5A-5D, operations are discussed as occurring among a logon service of a virtual machine (shown as LogonSvc 502), an applet included in the virtual machine to be instantiated and authenticated (shown as Applet 504), a VPN client resident on the virtual machine (shown as VPN client 506), the gateway providing an IPsec connection to the virtual machine (shown as IPsec VPN Gateway 508), the broker and associated vDRs (shown as Broker 510), an authorization service (shown as AuthSvc 512), and a credentialing service (shown as CredSvc 514).

Figure 5A:
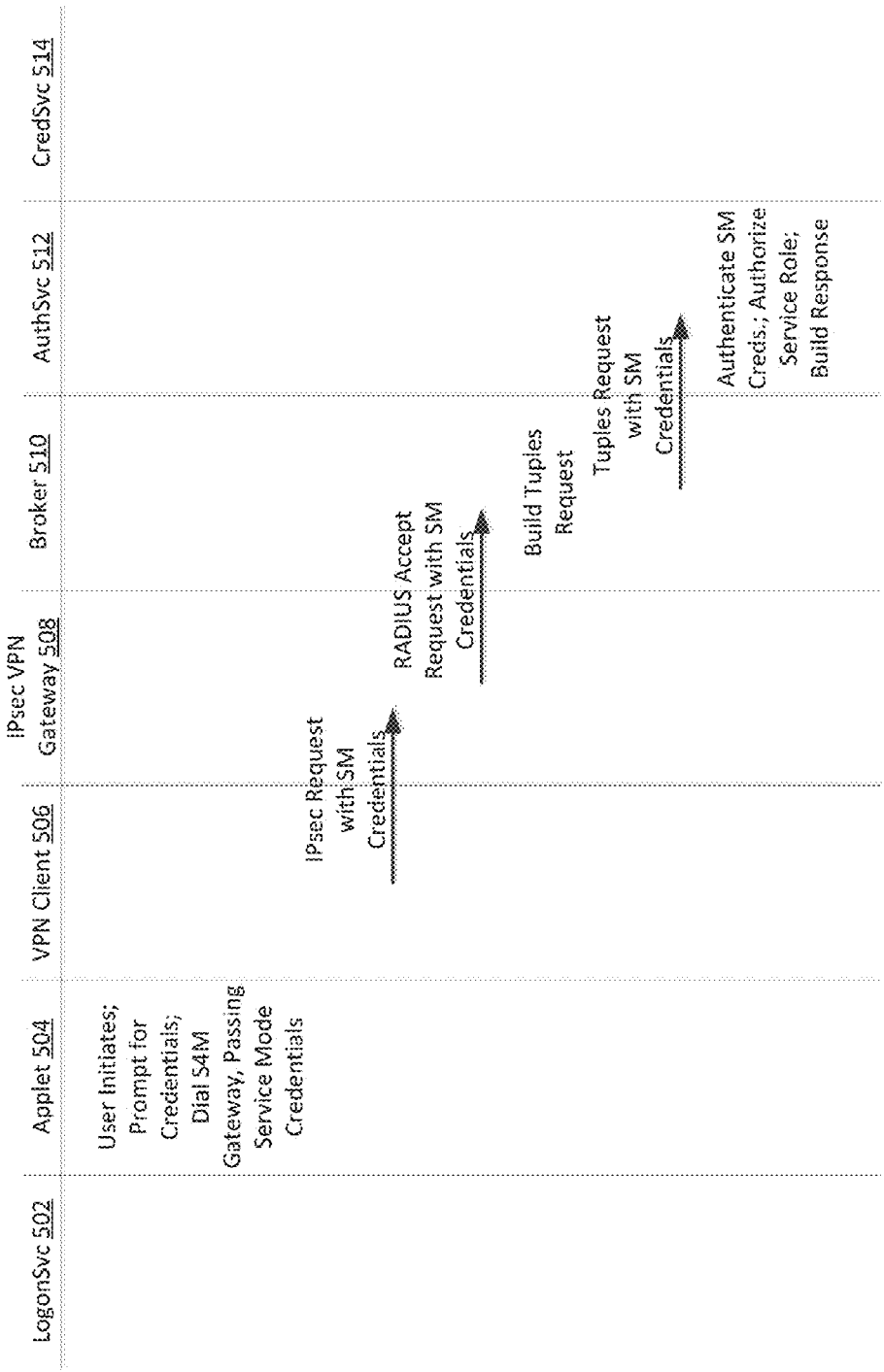
FIGS. 5A-5D illustrate a sequence of operations executable within a secure hybrid cloud useable to manage and authenticate secure cloud-based virtual machines, according to example embodiments of the present disclosure.

In the embodiment shown, and as seen in FIG. 5A, when a cloud-based VM (e.g., cloud-based VM 110 of FIG. 1, or analogous VMs shown in FIGS. 3-4), a user will initiate authentication of that virtual machine by initiating operation of the applet resident on the VM. The cloud-based VM may have pre-stored service mode credentials or may request them via a prompt. The Applet 504 then dials the gateway 508 and passes the service mode credentials to it. As shown, this can occur via an IPsec connection that is established via an IPsec request from the VPN client 506 to the IPsec VPN Gateway 508, and an associated Remote Authentication Dial In User Service (RADIUS) Accept request with service mode credentials included, transmitted from the IPsec VPN Gateway 508 to the Broker 510 (typically in clear text). At the Broker, a Tuples request is built, and transmitted to AuthSvc 512 with the service mode credentials. The AuthSvc 512 authenticates the service mode credentials received from the Applet 504, and authorizes a service role for the VM, thereby building a response to the received request.

Figure 5B:
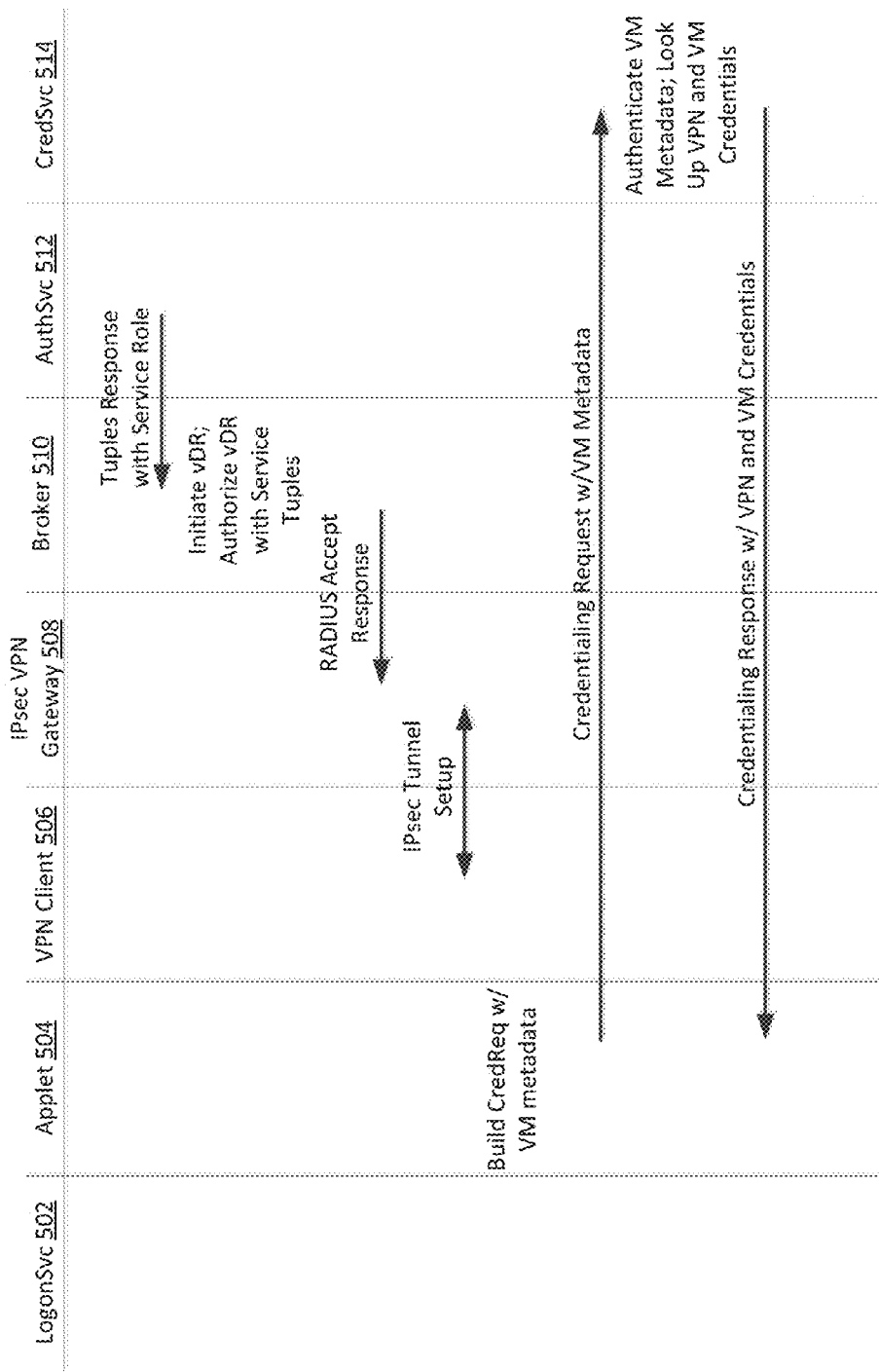

Continuing discussion of the cloud-based virtual machine authorization at FIG. 5B, after the response is built at the AuthSvc 512, a Tuples response is provided from the AuthSvc 512 to the Broker 510, which initiates a vDR using a service mode connection (e.g., establishing a service mode CO between the vDR and CredSvc 514). A RADIUS accept response is transmitted from the Broker 510 to the IPsec VPN Gateway 508, and an IPsec-based VPN tunnel is established between that IPsec VPN Gateway 508 and the VPN Client 506.

Once the secure IPsec-based connection is established between the cloud-based VM and the IPsec VPN Gateway 508, the Applet 504 builds a credential request using metadata describing the VM. This can include, for example data relating to a creation time of the VM or other operational characteristics that can validate the VM as being a new VM and as being a cloud-based VM that should be authorized. The credentialing request is transmitted from the Applet 504 to the CredSvc 514, which authenticates the VM based on the metadata, and looks up VPN and VM credentials for that cloud-based VM. CredSvc 514 responds with those credentials to the Applet 504.

Figure 5C:
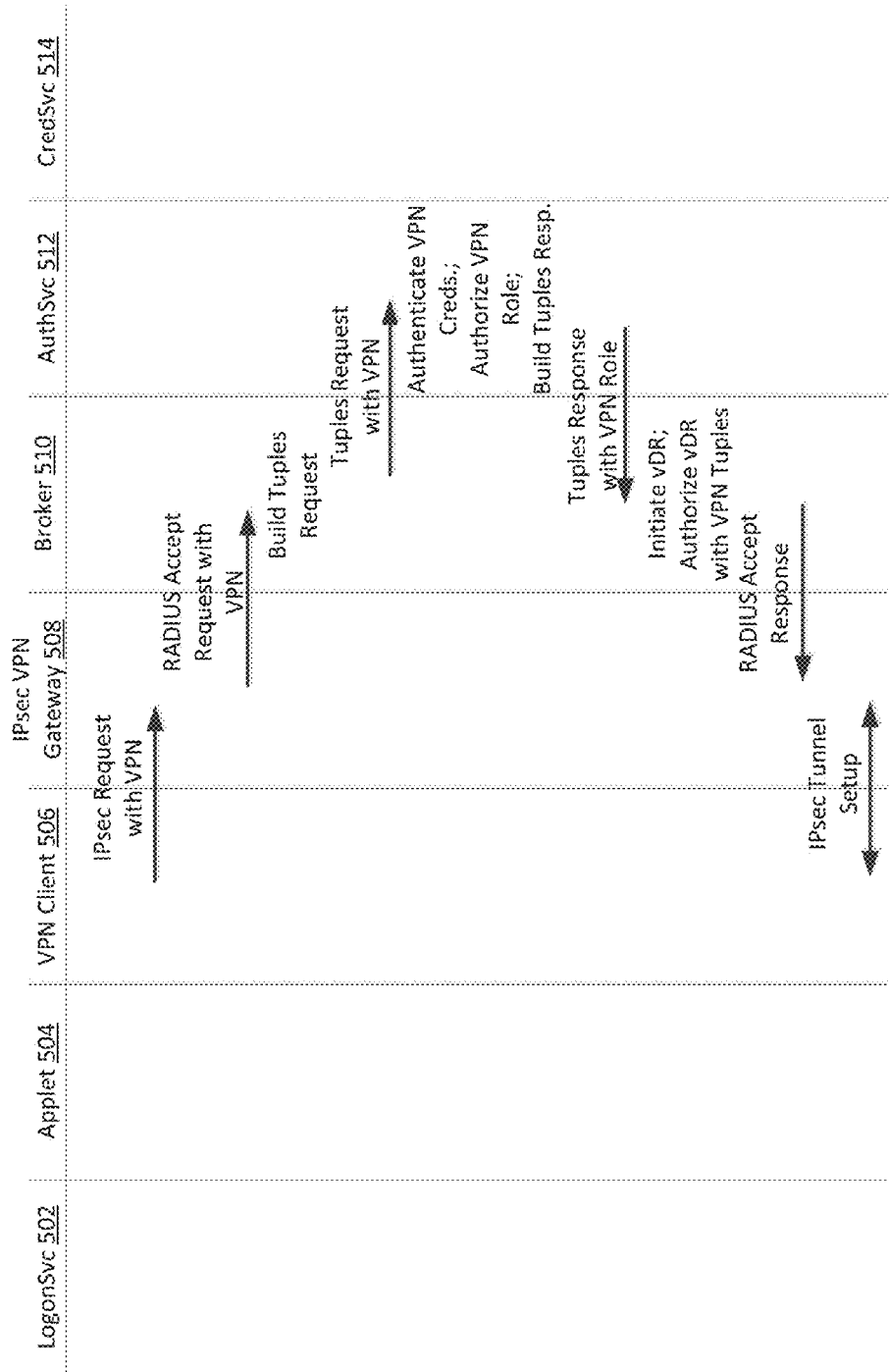

As seen in FIG. 5C, once the Applet 504 receives the credentials, VPN Client 506 transmits an IPsec request to the IPsec VPN Gateway 508 with the VPN credentials, and the IPsec VPN Gateway 508 forwards those credentials to the Broker 510 via a RADIUS accept request. The Broker 510 builds a tuples request and transmits that request to the AuthSvc 512, which authenticates the VPN credentials and authorizes the cloud-based VM's role. Accordingly, the AuthSvc 512 builds a tuples response and transmits that response to the Broker 510. The Broker 510 initiates a vDR with the VPN tuples, thereby providing the vDR with the private domain COI keys and filters that would be required for use by the cloud-based VM. A RADIUS accept response is forwarded to the IPsec VPN gateway 508, which establishes a secure tunnel to the VPN client 506 via IPsec.

Figure 5D:
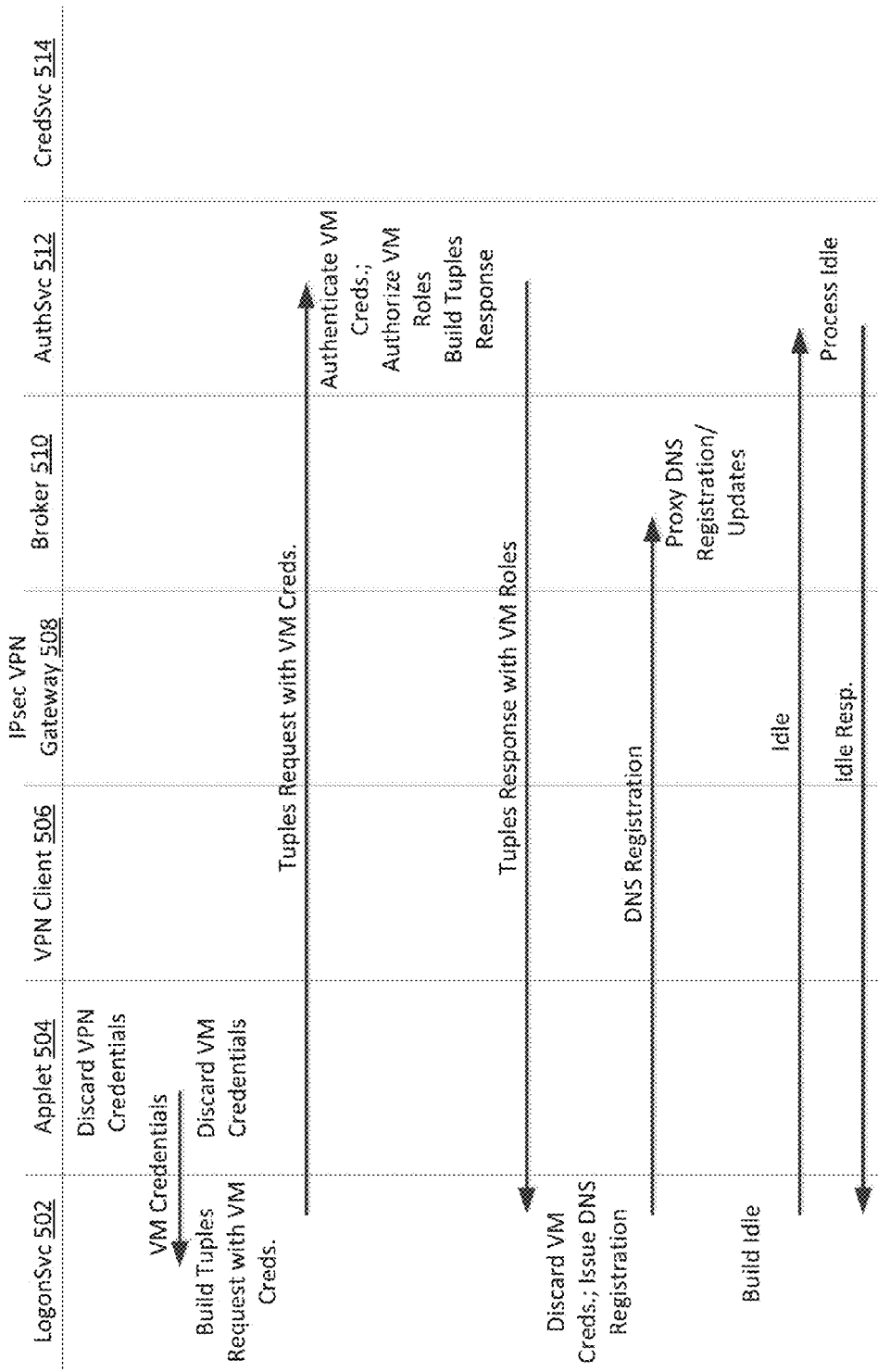

Continuing in FIG. 5D, once the secure tunnel is established, the Applet 504 discards the VPN credentials, since the vDR has already been established for use by the cloud-based VM with the appropriate COI keys and filters. The Applet 504 then transmits the VM credentials to a LogonSvc 502 and discards the credentials. The LogonSvc 502 builds a tuples request with the VM credentials, and transmits the tuples request to the AuthSvc 512. The AuthSvc 512 authenticates the VM credentials (i.e., the credentials used for intra-cloud secured communications via Stealth) and authorizes VM roles, building a tuples response to be returned to the LogonSvc 502. The LogonSvc 502, upon receiving this tuples response, discards the VM credentials and issues a DNS registration message to Broker 510. The Broker 510 proxies DNS registration for the cloud-based VM, and the LogonSvc 502 builds an idle message that is transmitted to the AuthSvc 512. The AuthSvc 512 processes the idle message, indicating that the VM is registered, and provides a confirming response.

Referring to FIGS. 5A-5D generally, accordingly, a cloud-based VM is thereby instantiated and authenticated, using separate COI keys for private domain communications and cloud-based COIs, linked by a secure IPsec communication channel between the cloud-based VM and a gateway that is linked to a dedicated virtual data relay that acts as the cloud-based VM by managing communications via COIs of which that VM is a member.

Figure 6:
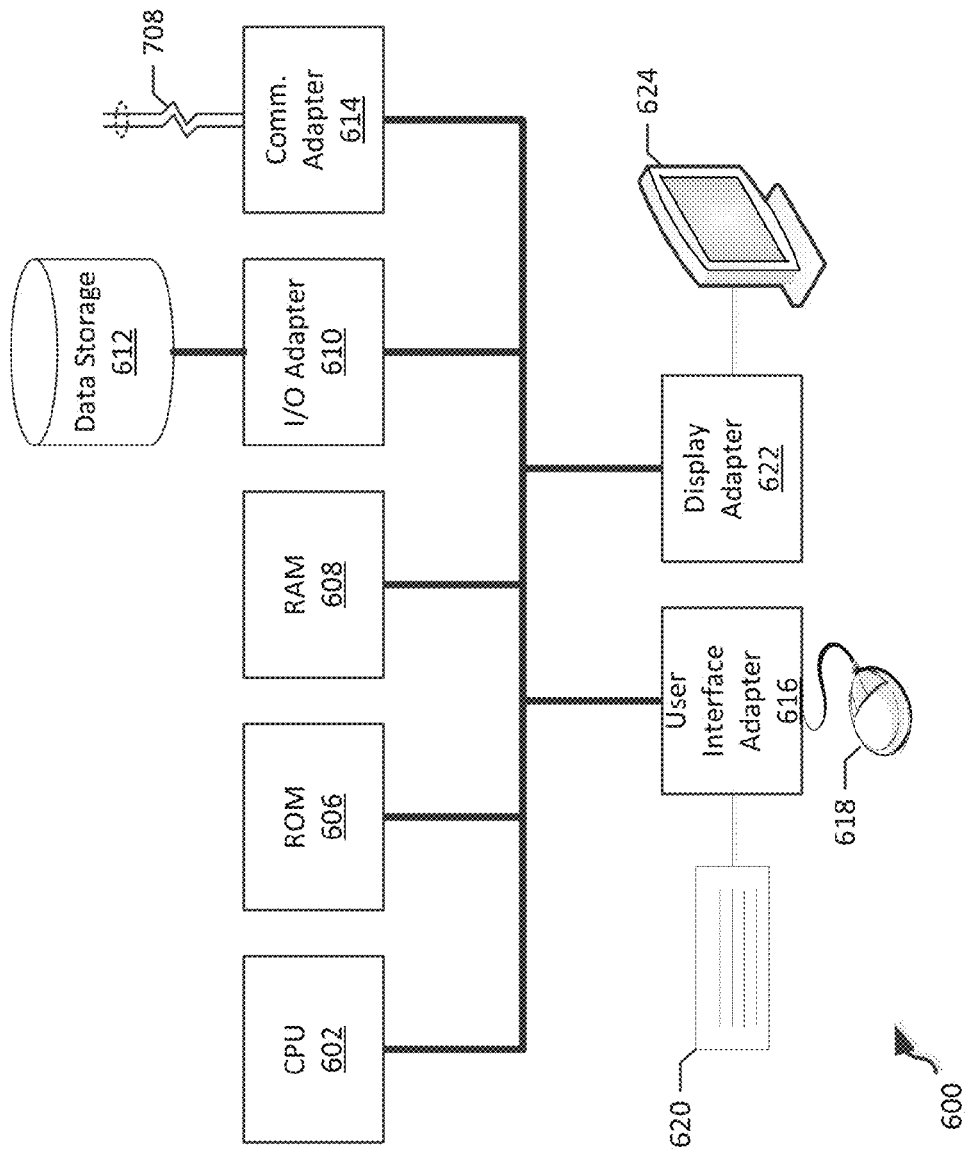
FIG. 6 illustrates an example computing system in which aspects of the present disclosure can be implemented.
Figure 7:
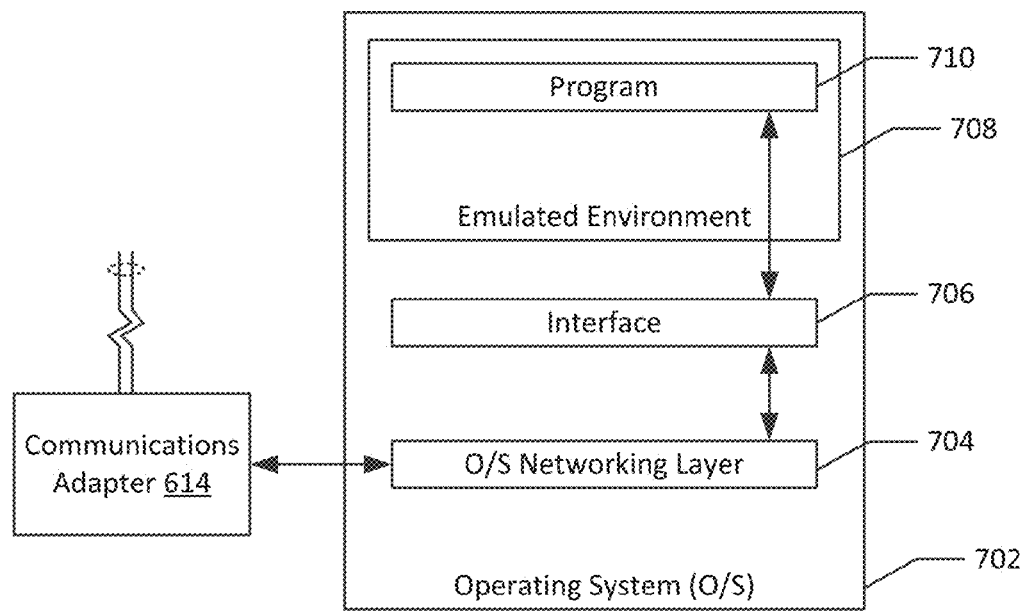
FIG. 7 illustrates an example virtualization environment implemented on a computing system, illustrating a mechanism by which private-domain and cloud-based virtual machines can be implemented.
Figure 8:
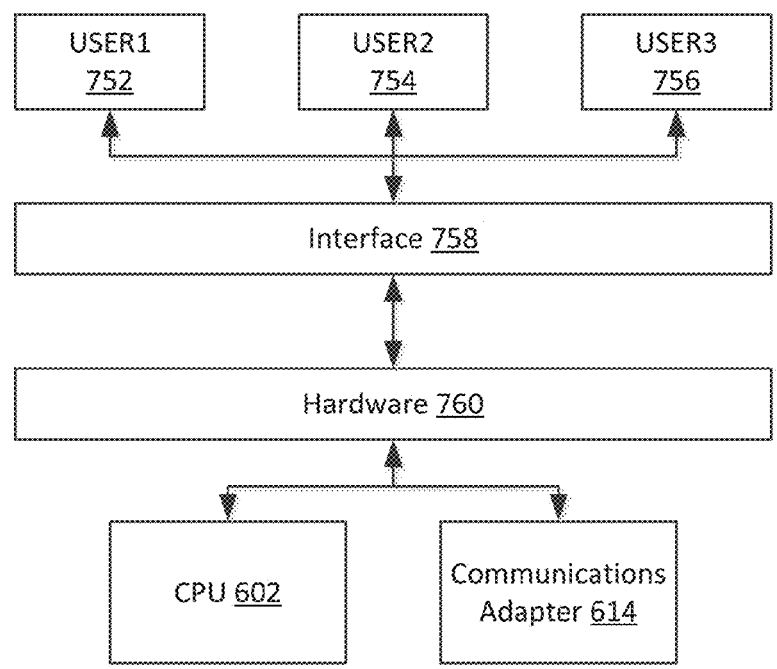
FIG. 8 illustrates an example multi-user computing arrangement illustrating shared computing resources across different partitions and/or virtual machines, according to example embodiments.

Referring to FIGS. 6-8, example details regarding computing systems in which aspects of the present disclosure can be implemented are provided. FIG. 6 illustrates a computer system 600 adapted according to certain embodiments of the server and/or the user interface device. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 also may include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network 708, which may be one or more of a LAN, WAN, and/or the Internet. The communications adapter 614 may also be adapted to couple the computer system 600 to other networks such as a global positioning system (GPS) or a Bluetooth network. The user interface adapter 616 couples user input devices, such as a keyboard 620, a pointing device 618, and/or a touch screen (not shown) to the computer system 600. The keyboard 620 may be an on-screen keyboard displayed on a touch panel. Additional devices (not shown) such as a camera, microphone, video camera, accelerometer, compass, and or gyroscope may be coupled to the user interface adapter 616. The display adapter 622 may be driven by the CPU 602 to control the display on the display device 624. Any of the devices 602-622 may be physical and/or logical.

The applications of the present disclosure are not limited to the architecture of computer system 600. Rather the computer system 600 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

FIG. 7 is a block diagram illustrating a server hosting an emulated software environment for virtualization according to one embodiment of the disclosure. An operating system 702 executing on a server includes drivers for accessing hardware components, such as a networking layer 904 for accessing the communications adapter 614. The operating system 702 may be, for example, Linux. An emulated environment 908 in the operating system 702 executes a program 710, such as CPCommOS. The program 710 accesses the networking layer 704 of the operating system 702 through a non-emulated interface 706, such as XNIOP. The non-emulated interface 706 translates requests from the program 710 executing in the emulated environment 708 for the networking layer 704 of the operating system 702.

In another example, hardware in a computer system may be virtualized through a hypervisor. FIG. 8 is a block diagram illustrating a server hosting an emulated hardware environment according to one embodiment of the disclosure. Users 752, 754, 756 may access the hardware 760 through a hypervisor 758. The hypervisor 958 may be integrated with the hardware 760 to provide virtualization of the hardware 760 without an operating system, such as in the configuration illustrated in FIG. 4A. The hypervisor 758 may provide access to the hardware 760, including the CPU 702 and the communications adaptor 614.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Referring to FIGS. 1-8 generally, it is noted that the arrangements described herein provide a number of advantages over existing hybrid cloud arrangements in terms of security and forwards-compatibility. In particular, because the architectures described herein rely only on a small addition of an applet to the virtual machines to assist in authentication of that virtual machine in the public or private context, and because that applet is customizable, the architecture described herein is both simple to manage and supports migration to future authentication arrangements or security architectures and protocols (e.g., to future Stealth or other security technologies).

Furthermore, because of the use of dedicated virtual data relays for each cloud-based VM, the security settings of a particular private domain can be extended to that cloud-based VM (and data can be seamlessly communicated among VMs in the private and cloud environments) without a requirement of sharing community of interest keys or filters to the cloud-based VM, ensuring the security of those keys and filters. Furthermore, because of the flexible configurations described herein, private virtualization systems, referred to in some cases herein as a private cloud, can be treated commonly with either cloud-based VMs (e.g., as in FIG. 3) for licensing, logging, and authentication purposes, or commonly with local, private hardware systems that require licensing, logging, and authentication for purposes of security. Additionally, the approach provided herein relies upon features added to virtual machines rather than any particular characteristics of the virtual machines or cloud environments themselves, and therefore can be extended to any of a number of different types of cloud environments.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for managing secure integration of a cloud-based computing resource with a private domain, the system comprising:
a hybrid cloud arrangement including a plurality of virtual machines, the plurality of virtual machines including at least a first virtual machine within the private domain and a second virtual machine within a public cloud;
a virtual data relay within the private domain and associated with the second virtual machine, the virtual data relay comprising:
a private domain interface used to establish a secure communication link according to a first security protocol with each virtual machine within the private domain that is a member of a community of interest, the virtual data relay assigned a community of interest key used by the private domain interface and defining the community of interest of which the second virtual machine is a member; and
a public cloud interface used to establish a secure communication link with the second virtual machine, the public cloud interface using a second security protocol different from the first security protocol.

2. The system of claim 1, wherein communications from virtual machines within the private domain that are members of the community of interest to the second virtual machine are routed to the second virtual machine via the virtual data relay.

3. The system of claim 1, wherein the virtual data relay exchanges data between the private domain interface and the public cloud interface via clear text.

4. The system of claim 1, wherein the second security protocol comprises IPsec.

5. The system of claim 4, wherein the first security protocol comprises Stealth.

6. The system of claim 4, wherein the public cloud interface forms a VPN connection to the second virtual machine from the virtual data relay.

7. The system of claim 1, further comprising a licensing server communicatively connected to one or more virtual machines in the private domain and in the public cloud via a third security protocol.

8. The system of claim 1, wherein the second security protocol is used to secure data transmitted from the private domain to the public cloud via the Internet.

9. The system of claim 1, further comprising:
a third virtual machine within the public cloud; and
a second virtual data relay within the private domain and associated with the third virtual machine, the second virtual data relay comprising:
a private domain interface used to establish a secure communication link according to a first security protocol with each virtual machine within the private domain that is a member of a second community of interest, the virtual data relay assigned a second community of interest key different from the community of interest key, the second community of interest key used by the private domain interface of the second virtual data relay and defining the second community of interest of which the third virtual machine is a member; and
a public cloud interface used to establish a secure communication link with the third virtual machine, the public cloud interface of the second virtual data relay using the second security protocol.

10. The system of claim 9, wherein the first virtual machine is included in the community of interest but excluded from the second community of interest, and wherein the first virtual machine can communicate with the second virtual machine but not the third virtual machine.

11. A method of securely integrating a cloud-based computing resource with a private domain, the method comprising:
establishing a virtual data relay in a private domain of a hybrid cloud arrangement including a plurality of virtual machines across a private domain and a cloud-based domain, the virtual data relay dedicated to a cloud-based virtual machine;
receiving data addressed to the cloud-based virtual machine at a private domain interface of the virtual data relay according to a first security protocol from a virtual machine within the community of interest, the virtual machine included within the private domain; and
transmitting the data to the cloud-based virtual machine according to a second security protocol different from the first security protocol.

12. The method of claim 11, further comprising assigning a role to each virtual machine within a hybrid cloud arrangement.

13. The method of claim 11, further comprising establishing a connection to a licensing server using a third security protocol.

14. The method of claim 13, wherein the first security protocol comprises a Stealth protocol and the second protocol comprises an IPsec protocol.

15. The method of claim 14, wherein the third security protocol comprises a second Stealth protocol incompatible with the Stealth protocol.

16. The method of claim 11, further comprising applying at least one filter at the second virtual data relay.

17. The method of claim 16, wherein the at least one filter defines a plurality of connection rules for the cloud-based virtual machine.

18. The method of claim 17, wherein the connection rules define an administrative community of interest, a service community of interest, and a license community of interest of which the cloud-based virtual machine is a member.

19. A system for managing secure integration of a cloud-based computing resource with a private domain, the system comprising:
a hybrid cloud arrangement including a plurality of virtual machines, the plurality of virtual machines including at least a first virtual machine within the private domain and a second virtual machine within a public cloud;
a virtual data relay within the private domain and associated with the second virtual machine, the virtual data relay comprising:
a private domain interface used to establish a secure communication link according to a Stealth protocol with each virtual machine within the private domain that is a member of a community of interest, the virtual data relay assigned a community of interest key used by the private domain interface to secure communications within a community of interest of which the second virtual machine is a member; and
a public cloud interface:
a gateway appliance through which communications from the virtual data relay are routed to the second virtual machine, the gateway appliance used to establish a VPN connection between the public cloud interface of the virtual data relay and the second virtual machine; and a licensing appliance accessible to each of the plurality of virtual machines via a licensing community of interest secured using a licensing community of interest key distributed to each of the plurality of virtual machines.

20. The system of claim 19, further comprising a credentialing service within the private domain, the credentialing service used to provide the community of interest key to the virtual data relay.

* * * * *